United States Patent [19]

Takamoto et al.

[11] Patent Number: 5,392,445
[45] Date of Patent: Feb. 21, 1995

[54] DATA STORING SYSTEM AND DATA TRANSFER METHOD WITH A PLURALITY OF DISK UNITS

[75] Inventors: Ken-ichi Takamoto; Kazuo Nakagoshi, both of Odawara; Naoya Takahashi, Yokohama; Makoto Kogai; Minoru Yoshida, both of Odawara, all of Japan

[73] Assignee: Hitachi Ltd., Tokyo, Japan

[21] Appl. No.: 89,144

[22] Filed: Jul. 7, 1993

[30] Foreign Application Priority Data

Jul. 9, 1992 [JP] Japan ................................ 4-182383

[51] Int. Cl.[6] ...................... G06F 11/00; G06F 13/00
[52] U.S. Cl. .................................. 395/800; 395/575; 395/425
[58] Field of Search ............... 395/800, 425, 575; 364/260.6, 951.3, 235.3, 236.2, 243.44, 248.1, 260.6, 964.6, 968

[56] References Cited

U.S. PATENT DOCUMENTS

| | | | |
|---|---|---|---|
| 4,843,389 | 6/1989 | Lisle et al. | 341/106 |
| 5,202,887 | 4/1993 | Ueno et al. | 371/10.1 |
| 5,206,939 | 4/1993 | Yanai et al. | 395/400 |
| 5,218,689 | 6/1993 | Hotle | 395/425 |
| 5,226,156 | 7/1993 | MacLean, Jr. et al. | 395/600 |
| 5,241,672 | 8/1993 | Slomcenski et al. | 395/600 |
| 5,247,618 | 9/1993 | Davis et al. | 395/275 |
| 5,247,638 | 9/1993 | O'Brien et al. | 395/425 |
| 5,247,646 | 9/1993 | Osterlund et al. | 395/425 |
| 5,301,350 | 4/1994 | Rogan et al. | 395/800 |

OTHER PUBLICATIONS

PCT International Laid Open Publication No. WO91/20076 (Laid-Open Date; Dec. 26, 1991).

*Primary Examiner*—Alyssa H. Bowler
*Assistant Examiner*—John A. Follansbee
*Attorney, Agent, or Firm*—Kenyon & Kenyon

[57] ABSTRACT

The write data is entered from the upper unit into a nonvolatile cache provided in a controller inside of each disk unit through a channel adaptor, a cache shared by each disk, and a disk adaptor. The data from the cache is compressed by the data compressing and restoring device and is written in the disk. At a time, the management information for compressed data is written in the cache and the disk as well. In case of breaking the management information of the cache when a failure takes place in the cache memory, the management information is written for each disk. Hence, the breakage does not have an adverse effect on the other disks. If the management information of the cache is broken, the management information given into the disk may be replaced with the broken information.

2 Claims, 4 Drawing Sheets

DATA STORING SYSTEM AND DATA TRANSFER METHOD WITH A PLURALITY OF DISK UNITS

BACKGROUND OF THE INVENTION

The present invention relates to a data storing system which utilizes a disk unit, and more particularly to the data storing system and the data transfer method which utilize a small-scaled disk unit provided with such a data compressing mechanism as enabling to equivalently increase a storage capacity of a disk.

In a conventional disk subsystem provided with a plurality of small disks and being connected to a host computer, it is known that data compression needs to be carried out for equivalently increasing the capacity of a disk. As a known method for compressing data, a compressing device, provided in a control unit shared by the plurality of disk units, operates to compress data records sent from the host computer and store the compressed data in a predetermined disk unit. This method is described in the publication of PCT International Publication No. WO91/20076 (Dec. 26, 1991), for example.

In the aforementioned art, however, the compressing device for compressing data and a cache memory for destaging data to the disk unit or staging data from the disk unit are both provided in the control unit shared by those disk units. Hence, the management of compressed data for those disk units is concentrated on the disk compressing device. This means that breakage of management information for data compression leads to breakage of all the data on the subsystems.

SUMMARY OF THE INVENTION

It is an object of the present invention to provide a data storing system and a data transfer method which operate to distribute compression of data and management of compressed data to each of the disk units for the purpose of inhibiting an adverse effect of breakage of management information for data compression onto all the disk subsystems connected to a host computer.

The aspect of the present invention is to include a plurality of disk units being connected to a host computer through a channel adaptor and a disk adaptor, each of those disk units having a disk and its controller. The disk unit provides in the controller a nonvolatile cache memory and a data compressing and restoring device for compressing data read out of the nonvolatile cache memory and writing the compressed data to the disk or restoring the compressed data read out of the disk and writing the restored data to the nonvolatile cache memory. Together with the data, the relevant management information for compressed data is written in the nonvolatile cache memory. The management information is represented by at least a head address, an end address, and a compressed data length of one data block.

When data is written on the disk, the management information for compressed data is also written in the nonvolatile cache memory and the disk. When data is read out of the disk, normally, the management information is read out of only the nonvolatile cache memory. If some failure takes place in the nonvolatile cache memory, the management information is read out of the disk.

In addition, a large-volume cache memory shared by the plurality of disk units is provided between the channel adaptor and the disk adaptor. No management information for compressed data is stored in the large-volume cache memory.

According to the present invention, the data compressing and restoring device and the nonvolatile cache memory for storing the management information for compressed data are provided in the controller of each of the disk units connecting to the subsystems. Each disk unit, therefore, enables to manage the compressed data. If some failure takes place in the nonvolatile cache memory, breakage of the management information for compressed data is localized on that disk unit.

The non-compressed data stored in the nonvolatile cache memory is compressed by the data compressing device and the compressed data is written onto the disk. At this time, the management information for the compressed data is written in the nonvolatile cache memory and the disk. If, therefore, the nonvolatile cache memory fails, the data is allowed to be easily recovered.

The non-compressed data stored in the large-volume cache memory is written in the cache memory related to each disk unit in a time-sharing manner. The operation of writing the non-compressed data stored in each cache memory in the corresponding disk as compressing it is performed in asynchronously to or independently of the disk adaptor. In other words, the operation of writing the non-compressed data from the cache memory to the disk as compressing it is performed in parallel to the operation of writing the non-compressed data from the cache memory to the disk as compressing it. Further, the operation of temporarily writing the compressed data from the disk to the cache memory as restoring it is performed in parallel to those operations. As a result, the cache memory and the data compressing and restoring device provided in the controller of each disk unit make it possible for each disk unit to compress and restore the data in parallel to or independently of the other disk units. This leads to surprisingly enhancing a data transfer speed.

As is described an embodiment of the present invention, the controller as an interface for use in between the disk adapter and the disk in the disk unit is of a type for SCSI (Small Computer System Interface), which is often used for small-scaled disk storing apparatus, but the data storing system of the present invention can also be used for large-scaled disk storing apparatus if using other interface devices.

DESCRIPTION OF THE PREFERRED EMBODIMENTS

Figure 1:
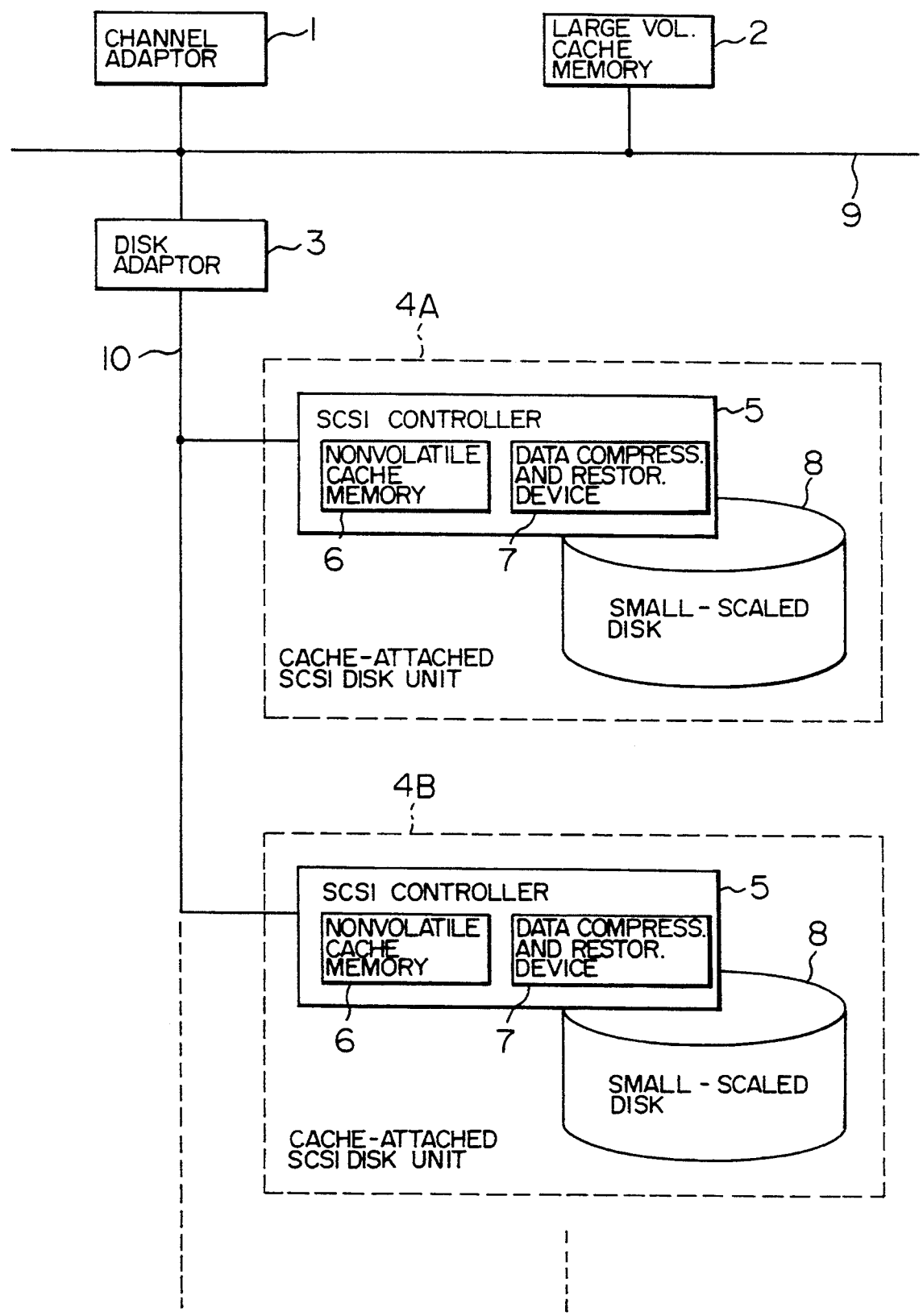
FIG. 1 is a block diagram showing an arrangement of a disk subsystem to which an SCSI disk unit provided with a data compressing and restoring device according to an embodiment of the present invention applies.

Now, an embodiment of the present invention will be described as referring to the drawings.

FIG. 1 is a block diagram showing a disk subsystem which uses a disk unit provided with the data compressing and restoring device according to the embodiment of the present invention. The disk subsystem employs an SCSI (Small Computer System Interface) as an I/O interface. The disk subsystem according to this embodiment is arranged to have a channel adaptor 1 for controlling a channel interface with a host computer (not shown), a large-volume cache memory 2 for temporarily holding data to be exchanged with the host computer, and a disk adaptor 3 for controlling a plurality of SCSI disk units 4A, 4B, . . . each providing a cache, being located in parallel. A numeral 9 denotes a data and control signal bus. A numeral 10 denotes an SCSI bus. The bus 9 is connected to a plurality of disk units like the disk units 4A and 4B through the similar disk adaptor to the part denoted as 3, which disk units are not shown. The large-volume cache memory 2 is commonly used for those disk units 4A, 4B, . . . . The writing and reading of data to this large-volume cache memory 2 are controlled by the channel adaptor 1.

In response to a READ instruction from the host computer, the channel adaptor 1 operates to check if the requested data stays in the large-volume cache 2. If it does, the data is transferred from the host computer to the channel adaptor 1. If it does not, for example, the data is read from the disk unit 4A through the disk adaptor 3 and is stored in the large-volume cache 2 and is transferred to the host computer through the channel adaptor 1. In response to a WRITE instruction, the channel adaptor operates to check if the requested data stays in the large volume cache 2. If it does, the data in the large volume cache 2 is rewritten and the channel adaptor 1 stops to operate. If, on the other hand, it does not, an empty space is secured in the large-volume cache 2 and then the requested data is read out of the disk unit 4A, for example. The requested data is rewritten with the read data. The data written in the large volume cache 2 is written from the disk unit 4A provided with the data compressing and restoring device in an asynchronous manner to the operation based on the WRITE indication.

As a feature of this embodiment, the SCSI controller 5 in the disk unit 4A provides a nonvolatile cache memory 6 and data compressing and restoring 7 in it. The non-compressed data stored in the large-volume cache 2 is temporarily stored in this cache memory in non-compressed fashion and then the data is compressed by this data compressing and restoring device 7. On a small-scaled disk set in the disk unit 4A, the data is stored in compressed fashion. As a compressing method, for example, the data is compressed by the known Run Length method, for example. The MH system or MMR system may be used for that purpose. Herein, to prevent disappearance of data resulting from power cut, the cache memory 6 is needed to provide.

Figure 2:
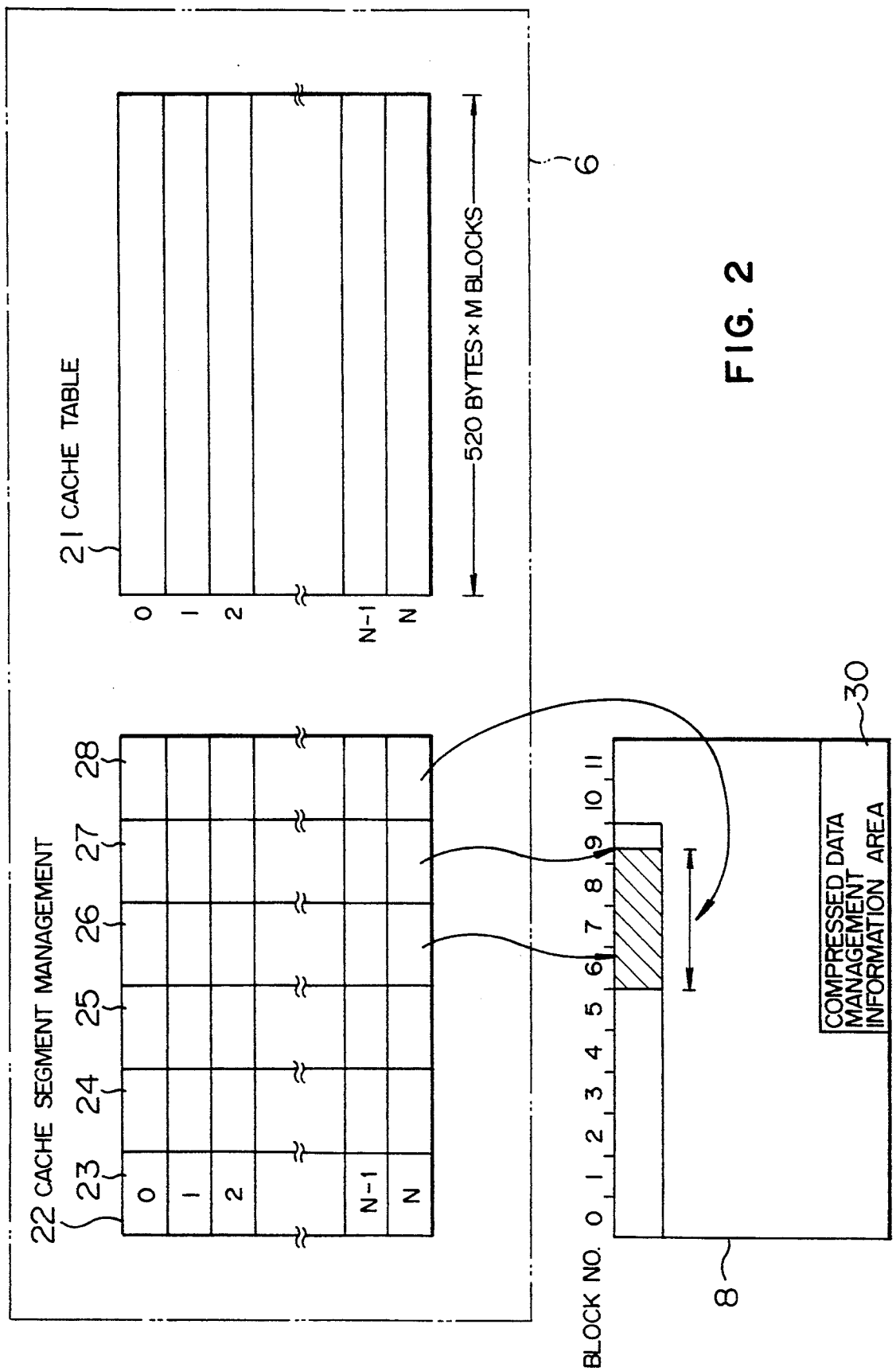
FIG. 2 is a view showing a relation between a small-scaled disk and a table of a nonvolatile cache memory provided in an SCSI controller.

FIG. 2 shows the relation between the small-scaled disk 8 and a table created on the cache memory 6 inside of the SCSI controller 5.

The cache memory 6 is configured of a cache table 21 for storing real data and a cache segment management table 22. The small-scaled disk 8 uses a fixed length block format. On the cache table 21, two or more blocks (one block consists of 520 bytes) compose one segment. The segments on the cache table 21 are managed by the cache segment management table 22. Staging (reading) of data from the small-scaled disk 8 to the cache table 21 or destaging (writing) of data from the cache table 21 to the small-scaled disk 8 is performed on a segment unit. The cache segment management table 22 stores as a segment unit a cache segment number 23, a final reference time 24 used for LRU (Least Recently Used) management of the cache, and a cache using condition 25. The cache using condition 25 contains information as to whether or not the requested cache segment is empty and whether or not the data on the requested cache segment has been already written on the small-scaled disk 8.

Destaging (writing) of data from the nonvolatile cache memory 6 inside of the controller 5 to the small-scaled disk 8 is carried out on a segment unit. The non-compressed data is compressed by the data compressing and restoring device 7 inside of the controller 5 and then is stored in the small-scaled disk 8. Together, a head address 26, an end address 27 and a compressed data length 28 of a predetermined block (520 bytes) on the small-scaled disk 8 for storing the compressed data are stored as management information for compressed data in the cache segment management table 22 inside of the cache memory 6 (see FIG. 1). In this case, the head address, the end address 27 and the compressed data length 28 of a block are written in the information area 30 for managing compressed data. This is intended to recover data if the cache memory 6 fails.

Staging (reading) of data from the small-scaled disk 8 to the cache memory 6 inside of the SCSI disk controller 5 is performed on the compressed data management information containing the head address 26, the end address 27 and the compressed data length 28 of the block stored in the cache segment management table 22 inside of the cache memory 6. The data is read from the small-scaled disk 8 through the data compressing and restoring device 7 in which the compressed data is restored into the non-compressed data. The non-compressed data is stored in the cache table 21. If the cache memory 6 fails, the data is allowed to be easily restored, because the compressed data management information 30 is written in the small-scaled disk 8 as well.

Destaging (writing) of data from the cache memory 6 to the small-scaled disk 8 and destaging (reading) of data from the small-scaled disk 8 to the cache memory 6 will be described as referring to the flowcharts shown in FIGS. 3 and 4.

Figure 3:
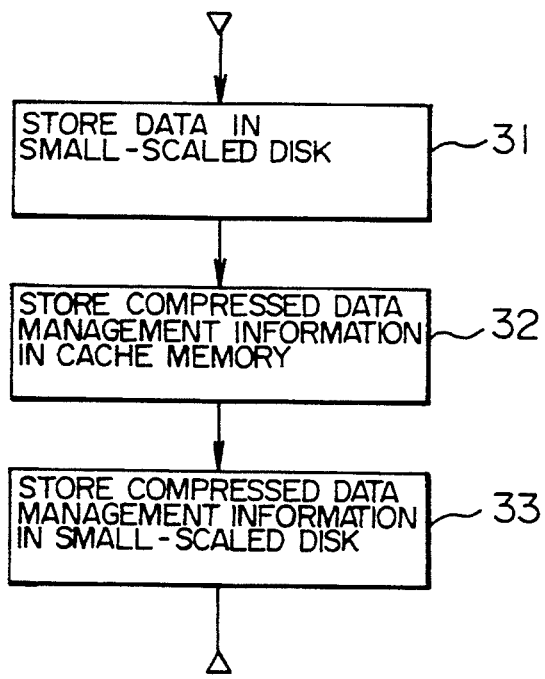
FIG. 3 is a flowchart showing an operation of writing data from the nonvolatile cache memory in the SCSI controller to the small-scaled disk.
Figure 4:
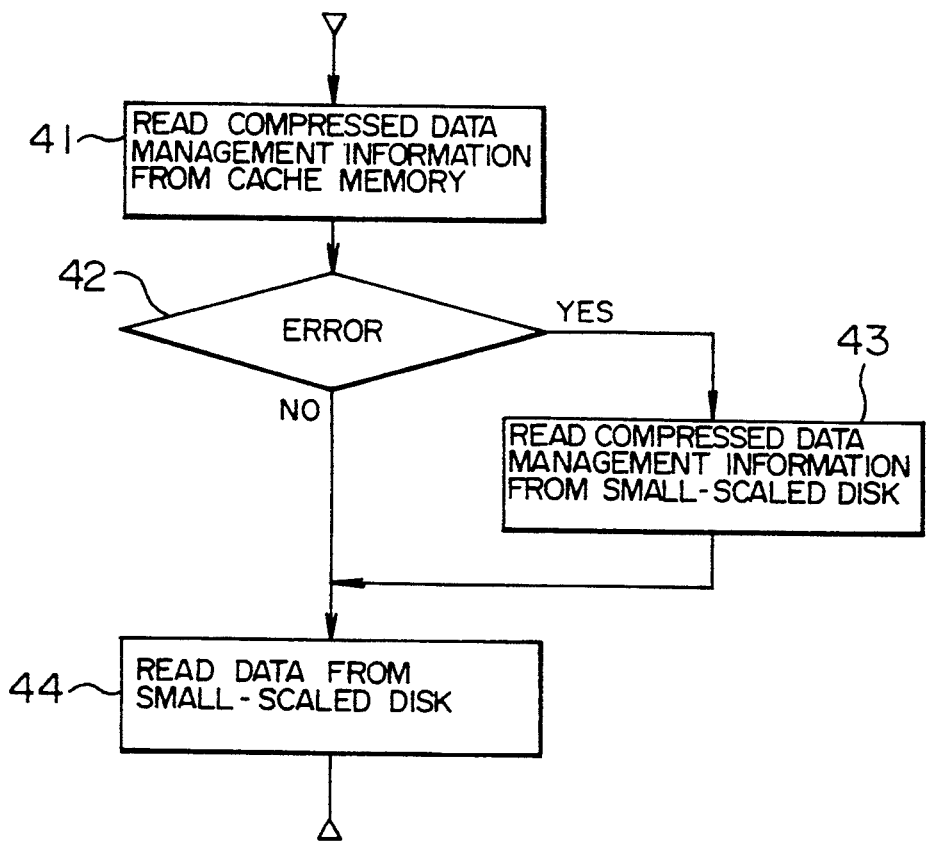
FIG. 4 is a flowchart showing an operation of reading data from the nonvolatile cache memory in the SCSI controller to the small-scaled disk.
Figure 5:
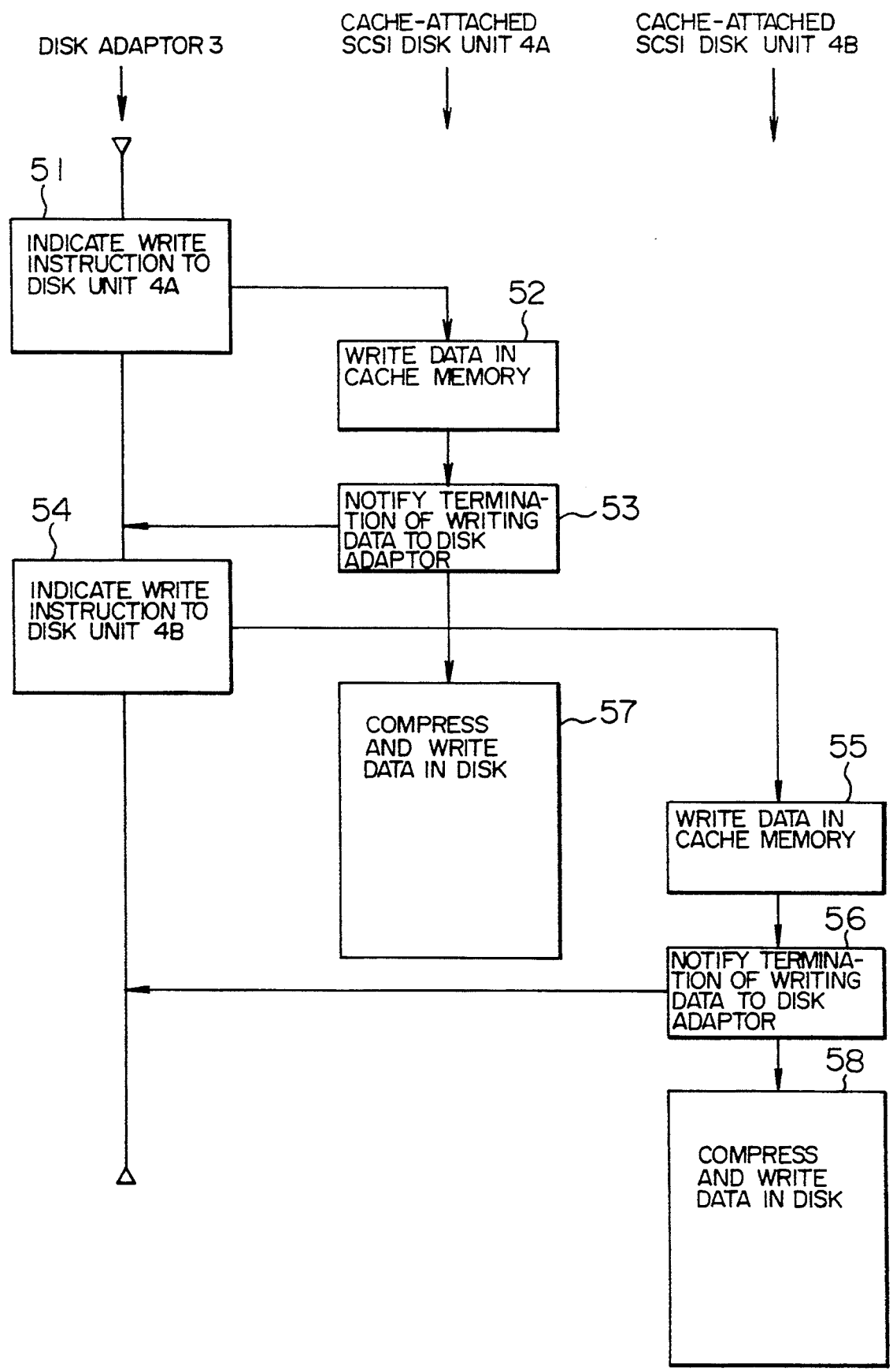
FIG. 5 is a flowchart for explaining a data transfer method according to the present invention.

When writing data, at a step 31 of FIG. 3, the non-compressed data temporarily stored in the cache table 21 of the cache memory 6 is compressed by the data compressing and restoring device 7 and the compressed data is stored in the small-scaled disk 8. Next, at a step 32, the compressed data management information is stored in the cache memory 6. At a step 33, the compressed data management information is stored in the compressed data management information area 30 inside of the small-scaled disk 8. When reading data, on the other hand, at a step 41 shown in FIG. 4, the compressed data management information stored in the cache memory 6 is read therefrom. At a time, at a step 42, it is determined whether or not the compressed data management information may be read out. If failure of the cache memory 6 inhibits pick-up of information, at a step 43, the compressed data management information is read out from the compressed data management information area 30 inside of the small-scaled disk 8. Based on this compressed data management information, at a step 44, the compressed data is read out from the small-scaled disk 8 and is sent to the data compressing and restoring device 7 in which the compressed data is restored to the non-compressed, original data. The original data is staged (read out) to the nonvolatile cache memory 6. In this embodiment, the operations at the steps 31 to 33 are serially executed. In actual, writing of the compressed data management information to the small-scaled disk 8 may be performed later for collective blocks.

It is noted that writing the compressed data management information into the small-scaled disk 8 in the step 33 can be omitted. In the case of omitting the step 33, a failure of the disk may be detected if a failure of reading the compressed data management information is caused in the step 42.

In this embodiment, the compressing and restoring device is provided with the cache-attached SCSI controller 5 of the disk unit 4A and the management information for compressed data is written in the cache memory 6 and is written in the small-scaled disk 8. In reading data, normally, the data is read out from the cache memory 6 only without having to read the management information for compressed data. This makes it possible to enhance the performance for reading higher than that for writing. Further, if the cache memory 6 fails, the requested data is allowed to be easily recovered at each of the small-scaled disk 8 by referring the management information for compressed data directly written in the small-scaled disk 8. In case of some failures such as disk crash (breakage of a disk medium surface by head friction) or software bug (breakage of software management information), such failures may be localized at each disk unit.

As is described the embodiment, the SCSI controller 5 as an interface is provided between the disk adapter 3 and the disk 8 in the disk unit 4A for use in a relatively small-scaled disk storing apparatus, but the SCSI controller 5 can be replaced with other controllers for use in a large-scaled disk storing apparatus.

The foregoing description has been expanded mainly about the disk unit 4A. Of course, it holds true to the disk unit 4B.

Next, with reference to FIG. 1, the description will be oriented to the specific operation of this invention resulting from the nonvolatile cache memory 6 and the data compressing and restoring device 7 provided in each of the cache-annexed SCSI disk units 4A, 4B . . . as shown in FIG. 1.

The specific operation is characterized by the writing of non-compressed data stored in the large volume cache memory 2 to each of the disk units 4A, 4B, . . . . That is, in a case that at a step 51, a WRITE instruction is given for writing the non-compressed data stored in the large volume cache memory 2 to the disk unit 4A through the disk adaptor 3, at a step 52, the non-compressed data in the large volume cache memory 2 is written in the cache memory 6 of the disk unit 4A. At a step 53, the disk unit 4A notifies the disk adaptor 3 of terminating the writing of the non-compressed data. Then, after the notification of the termination is received in the disk adaptor 3, at a step 54, the disk adaptor 3 indicates the WRITE instruction to the disk unit 4B provided that the WRITE instruction is given for writing the non-compressed data stored in the large volume cache memory 2 onto the disk unit 4B. At a step 55, the non-compressed data stored in the large volume cache memory 2 is written in the cache memory 6 of the disk unit 4B. And, at a step 56, the disk unit 4B notifies the disk adaptor 3 of terminating the writing of the non-compressed data.

As set forth above, the non-compressed data stored in the large-volume cache memory 2 is written in each of the cache memories 6 for the disk units 4A and 4B in a time-sharing manner. However, the operation at the steps 57 and 58 of writing the non-compressed data stored in each of the cache memories 6 for the disk units 4A and 4B in compressed fashion is performed asynchronously to or independently of the disk adaptor 3. In other words, it is to be understood that the operation at the step 54 of writing the non-compressed data from the cache memory 6 of the disk unit 4A to the small disk in compressed fashion is executed in parallel to the operation at the step 58 of writing the non-compressed data from the cache memory 6 of the disk unit 4B to the small-scaled disk 8 in compressed fashion. In addition, the operation of writing the non-compressed data from the cache memory 6 to the small-scaled disk 8 may be executed in parallel to the operation of temporarily writing the compressed data stored in the small-scaled disk 8 to the cache memory as restoring it. Though this operation is not discussed herein, it may be easily understood from FIGS. 1 to 5 by the persons skilled in the art. When the restored data is written from the cache memory 6 to the large volume cache memory 2, it is done in a time-sharing manner based on the READ instruction from the disk adaptor 3.

As mentioned above, the cache memory 6 and the data compressing and restoring device 7 are provided in the controller 5 of each of the disk units 4A and 4B so that the compression and restoring of data for the disk units 4A and 4B are executed in parallel to or independently of each other. This results in greatly enhancing a data transfer speed in comparison to the conventional technique in which the data compressing and restoring device connected to the large volume cache memory 2 serves to compress all the data for the disk units in a batch.

What is claimed is:

1. In a data transfer method for transferring data between a large volume cache memory provided with a host computer and a plurality of first to n-th disk units being coupled to a bus through a channel adaptor and a disk adaptor, said data transfer method comprising the steps of:

a) outputting a first WRITE instruction for data stored in said large volume cache memory from said host computer to said first disk unit through said channel adaptor and said disk adaptor;

b) transferring data stored in said large volume cache memory to a first cache memory provided in said first disk unit, based on said first WRITE instruction, and notifying termination of transferring to said first cache memory to said disk adaptor;

c) outputting a second WRITE instruction for data stored in said large volume cache memory to said second disk unit through said disk adaptor;

d) transferring data stored in said large volume cache memory to a second cache memory provided in said second disk unit based on said second WRITE instruction, and notifying termination of transferring to said second cache memory to said disk adaptor;

e) transferring the data stored in said first cache memory to a first data compressing and restoring device to compress the data and generate first management information for the compressed data, transferring the first management information to said first cache memory, and transferring the compressed data with the first management information to a first disk; and f) transferring the data stored in said second cache memory to a second data compressing and restoring device to compress the data and generate second management information for the compressed data, transferring the second management information to said second cache memory, and transferring the compressed data with the second management information to a second disk independently regardless of transferring the compressed data to the first disk at the step e).

2. In a data transfer method for transferring data between a large volume cache memory provided with a host computer and a plurality of first to n-th disk units being coupled to a bus through a channel adaptor and a disk adaptor, said data transfer method comprising the steps of:

a) outputting a first READ instruction for data stored in a first disk provided in said first disk unit from said host computer to said first disk unit through said channel adaptor and said disk adaptor;

b) transferring data stored in said first disk to a first data compressing and restoring device and restoring the data stored in said first disk to uncompressed data using management information stored in a first cache memory in the first disk unit, or upon failure of the first cache memory using management information stored in the first disk;

c) outputting a second READ instruction for data stored in a second disk provided in said second disk unit to said second disk unit through said disk adaptor;

d) transferring data stored in said second disk to a second data compressing and restoring device and restoring the data stored in said second disk to uncompressed data using management information stored in a second cache memory in the second disk unit, or upon failure of the second cache memory using management information stored in the second disk in parallel to the restoring and transferring the data at the step b); and e) transferring the data transferred to said first cache memory and second cache memory to said large volume cache memory in response to a reading sequence of said first and second READ instruction to said large volume cache memory through said disk adaptor.

* * * * *

UNITED STATES PATENT AND TRADEMARK OFFICE
CERTIFICATE OF CORRECTION

PATENT NO. : 5,392,445

DATED : February 21, 1995

INVENTOR(S) : Ken-ichi TAKAMOTO et al

It is certified that error appears in the above-identified patent and that said Letters Patent is hereby corrected as shown below:

| Column | Line | Corrections |
|--------|------|-------------|
| 1 | 42 | Change "aspect" to --object--. |
| 2 | 40 | Change "This leads to surprisingly" to --This surprisingly leads to--. |
| 2 | 42 | After "described" insert --in--. |
| 3 | 5 | Change "as referring" to --with reference-- |
| 3 | 50 | After "restoring" insert --device--. |
| 3 | 61 | Delete "to provide". |
| 4 | 28 | After "address" insert --26--. |
| 4 | 44 | After "information" insert --in area--. |
| 4 | 49 | Change "as" to --by--. |
| 5 | 30 | After "referring" insert --to--. |

UNITED STATES PATENT AND TRADEMARK OFFICE
CERTIFICATE OF CORRECTION

PATENT NO. : 5,392,445

DATED : February 21, 1995

INVENTOR(S) : Ken-ichi TAKAMOTO et al

It is certified that error appears in the above-identified patent and that said Letters Patent is hereby corrected as shown below:

| Column | Line | Corrections |
|---|---|---|
| 5 | 37 | After "described" insert --in--. |
| 6 | 16 | Change "small disk" to --small-scaled disk 8--. |

Signed and Sealed this

Twenty-sixth Day of December, 1995

Attest:

BRUCE LEHMAN

Attesting Officer    Commissioner of Patents and Trademarks